Figure 1:
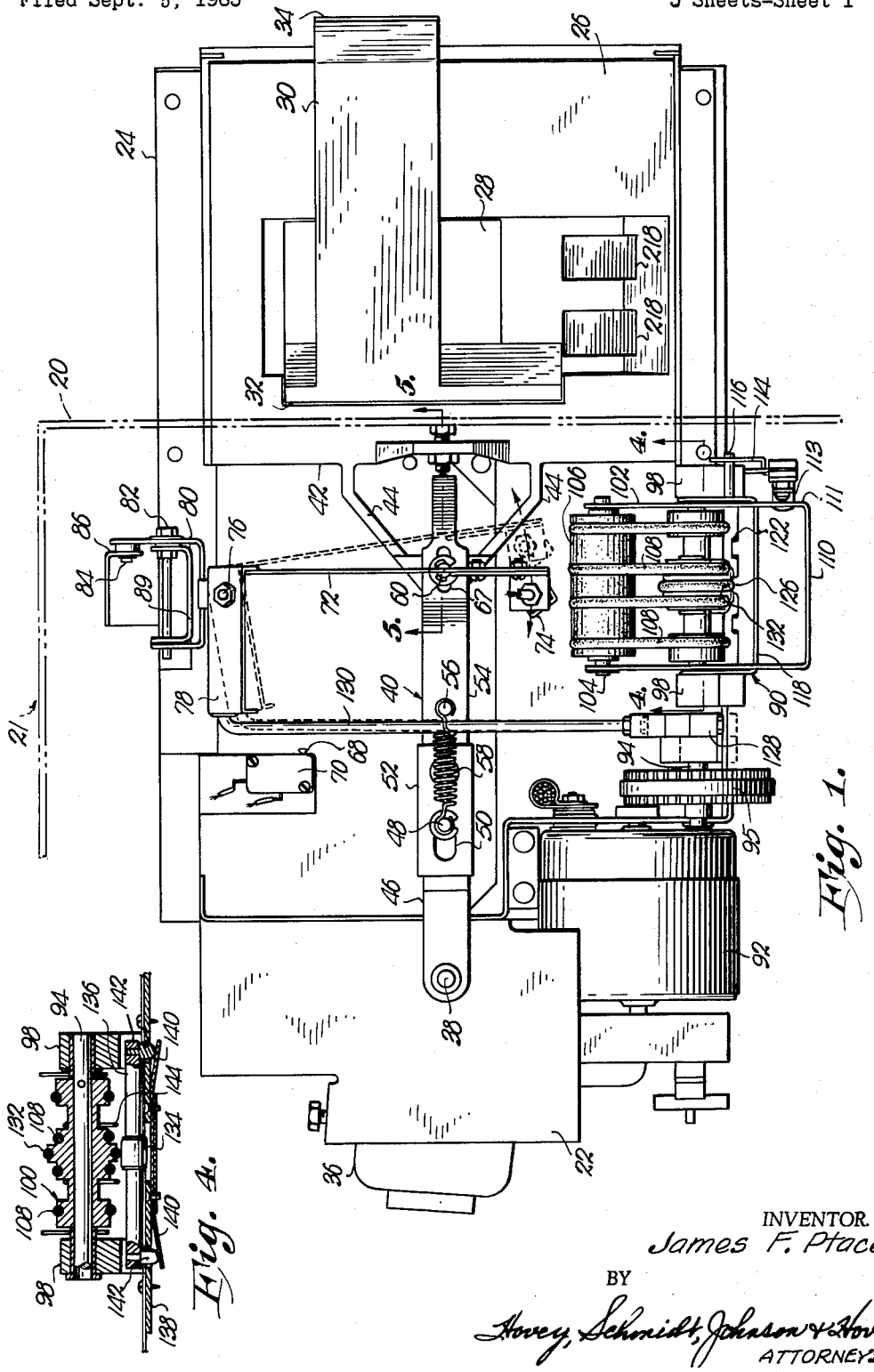

June 21, 1966     J. F. PTACEK     3,256,984
MAGNETIC DETECTION APPARATUS FOR CURRENCY CHANGING MACHINE
Filed Sept. 5, 1963     5 Sheets-Sheet 1

INVENTOR.
James F. Ptacek
BY
Hovey, Schmidt, Johnson & Hovey
ATTORNEYS.

June 21, 1966 J. F. PTACEK 3,256,984
MAGNETIC DETECTION APPARATUS FOR CURRENCY CHANGING MACHINE
Filed Sept. 5, 1963 5 Sheets-Sheet 3
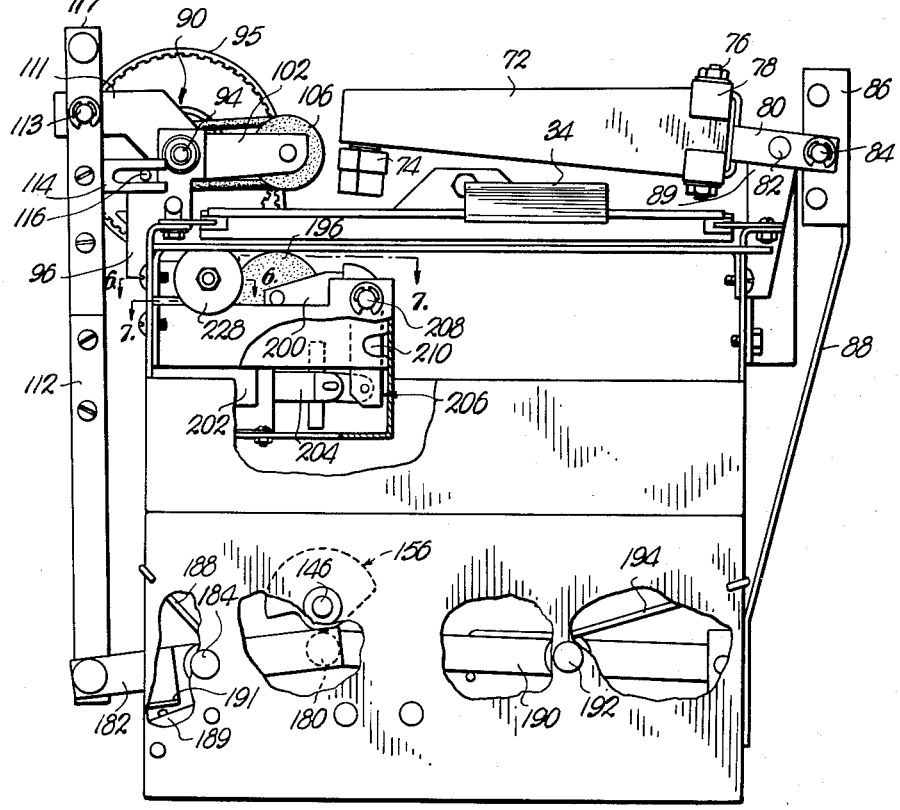
Fig. 3.
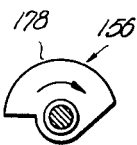  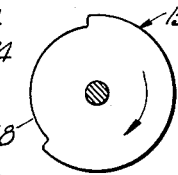 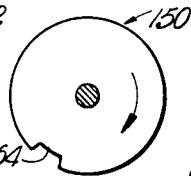 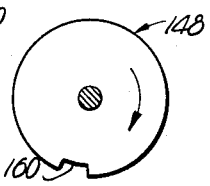
Fig. 8. Fig. 9. Fig. 10. Fig. 11. Fig. 12.
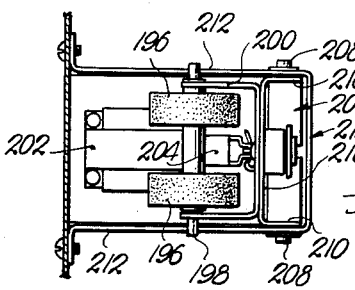
Fig. 7.
INVENTOR.
James F. Ptacek
BY
Hovey, Schmidt, Johnson & Hovey
ATTORNEYS.

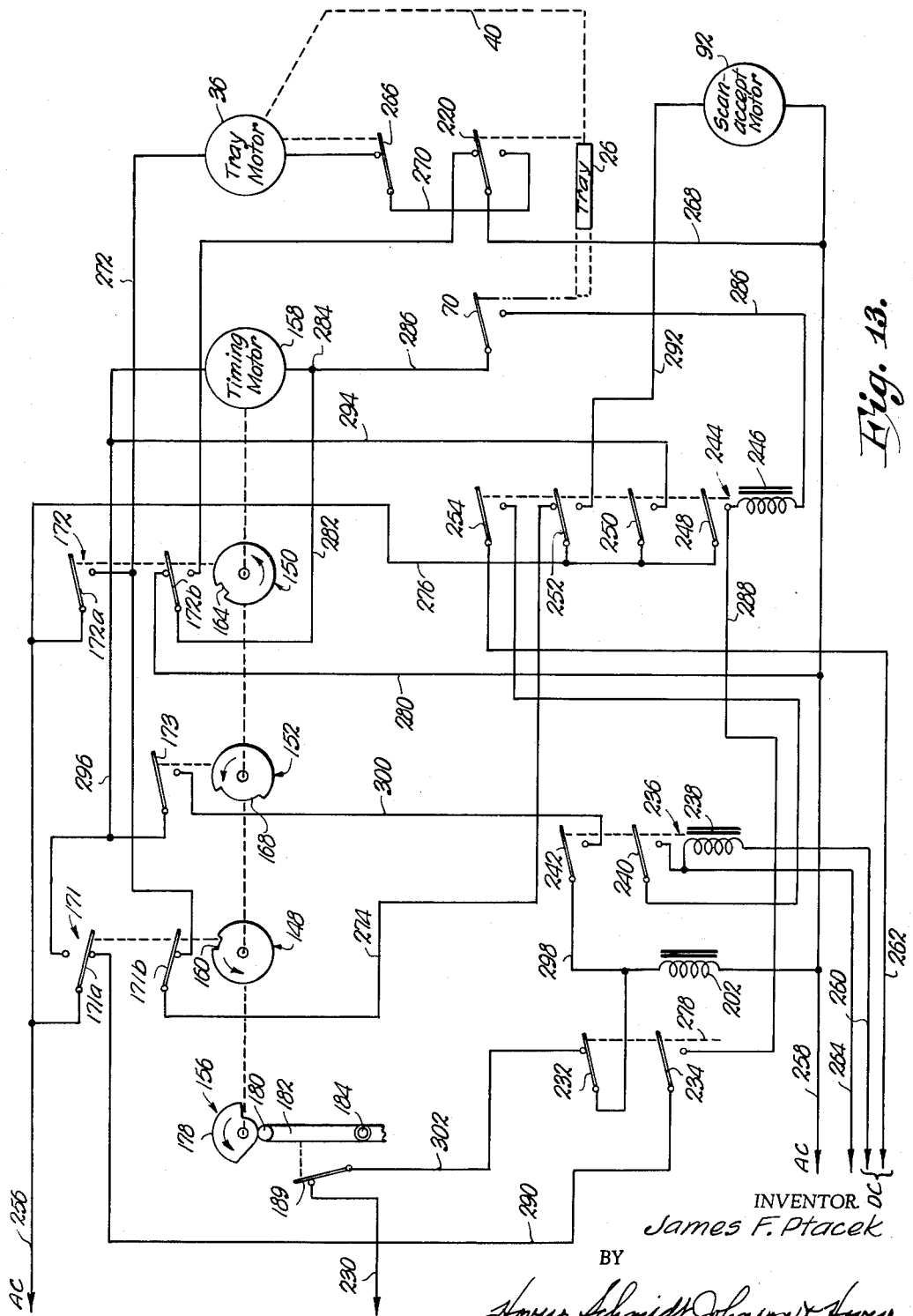

June 21, 1966     J. F. PTACEK     3,256,984
MAGNETIC DETECTION APPARATUS FOR CURRENCY CHANGING MACHINE
Filed Sept. 5, 1963     5 Sheets-Sheet 5

INVENTOR.
James F. Ptacek
BY
Hovey, Schmidt, Johnson & Hovey
ATTORNEYS

United States Patent Office 3,256,984
Patented June 21, 1966

3,256,984
MAGNETIC DETECTION APPARATUS FOR
CURRENCY CHANGING MACHINE
James F. Ptacek, Independence, Mo., assignor to The
Vendo Company, Kansas City, Mo., a corporation of
Missouri
Filed Sept. 5, 1963, Ser. No. 306,835
11 Claims. (Cl. 209—111.5)

This invention relates generally to apparatus for testing a document to determine the presence of magnetic materials thereon and, more specifically, to apparatus for testing the genuineness of currency imprinted with magnetic ink.

At the outset it should be understood that the instant invention finds particular utility when employed as a part of a currency-changing machine. The basic function of such currency changers is to receive and examine a dollar bill or other currency and, if the currency is determined to be genuine, to then pay out an amount of change equal in value to that of the received currency. Simultaneously, the currency is conveyed by the machine to a storage receptacle which may be periodically unloaded by the owner of the machine.

The basic need for currency changers arises from the demands of the vending machine art wherein it is desired to provide apparatus that will breakdown coinage and currency of relatively large denominations into smaller coinage for use in the operation of vending machines. Therefore, the currency changer is commonly placed adjacent a group of vending machines so that use of the machines will be encouraged.

Heretofore, various types of apparatus have been employed that will accept genuine coinage but reject coinage which is unfit for negotiation for one reason or the other. The presence of counterfeit coinage and bills is, of course, one primary reason for the necessity of providing suitable rejecting mechanism. Although coin rejectors have been in existence for some period of time, bill-changing apparatus is relatively new and yet presents many problems in the design and construction of testing and rejecting mechanism. Alternatively, the currency changer may become a component of a vending machine, in which case it will be arranged to pay back to the customer any difference between deposited currency and price of merchandise or services purchased.

It is, therefore, the primary object of this invention to provide improved means of testing the genuineness of paper currency. More specifically, since United States paper currency is imprinted with magnetic ink, an important object of this invention is to provide electrical apparatus for testing the genuineness of such paper currency by scanning the latter with a magnetic field.

Another object of this invention is to provide electrical apparatus for providing an output signal if the paper currency under test has predetermined magnetic properties.

Still another object of this invention is to provide apparatus having means for receiving currency to be tested and moving such currency to a test location within the apparatus, whereupon a magnetic head is employed to scan the currency to determine its genuineness.

Yet another object of this invention is to provide means for reasonably holding currency under test at a test station while a magnetic head is moved over the currency to scan the latter to determine its genuineness. Furthermore, it is an object of this invention to provide electronic circuitry for use in cooperation with this structure for generating an output signal if the currency has predetermined magnetic properties indicative of genuineness.

It will become evident from the description to follow that the instant invention is also adapted for applications other than the testing of currency. For example, this invention may be employed to test any document to check for the presence of a particular magnetic pattern. Therefore, it is another object of the instant invention to provide apparatus for verification of authenticity of a document by scanning the surface of the same for the presence of a magnetic material.

Figure 2:
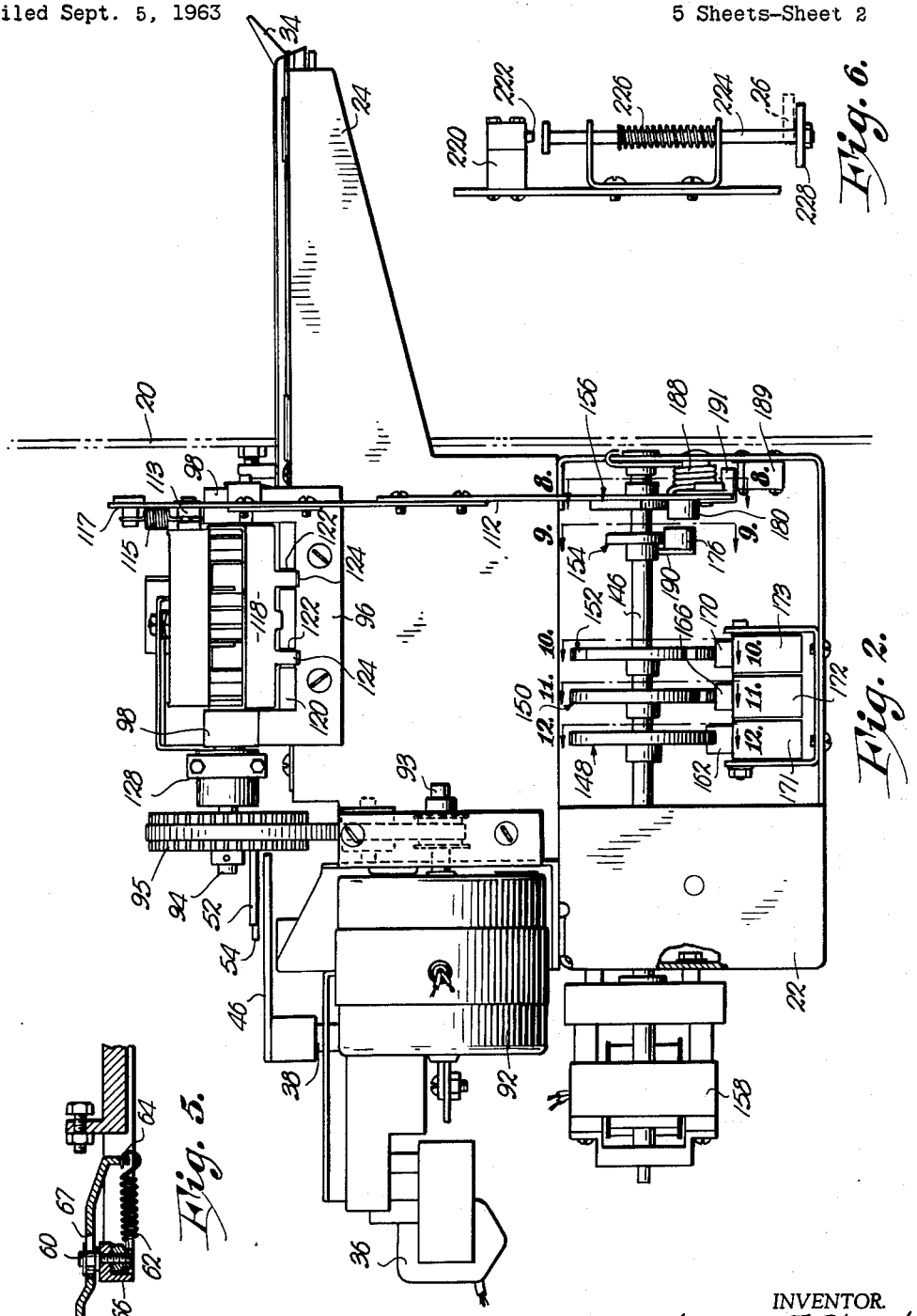
Figure 14:
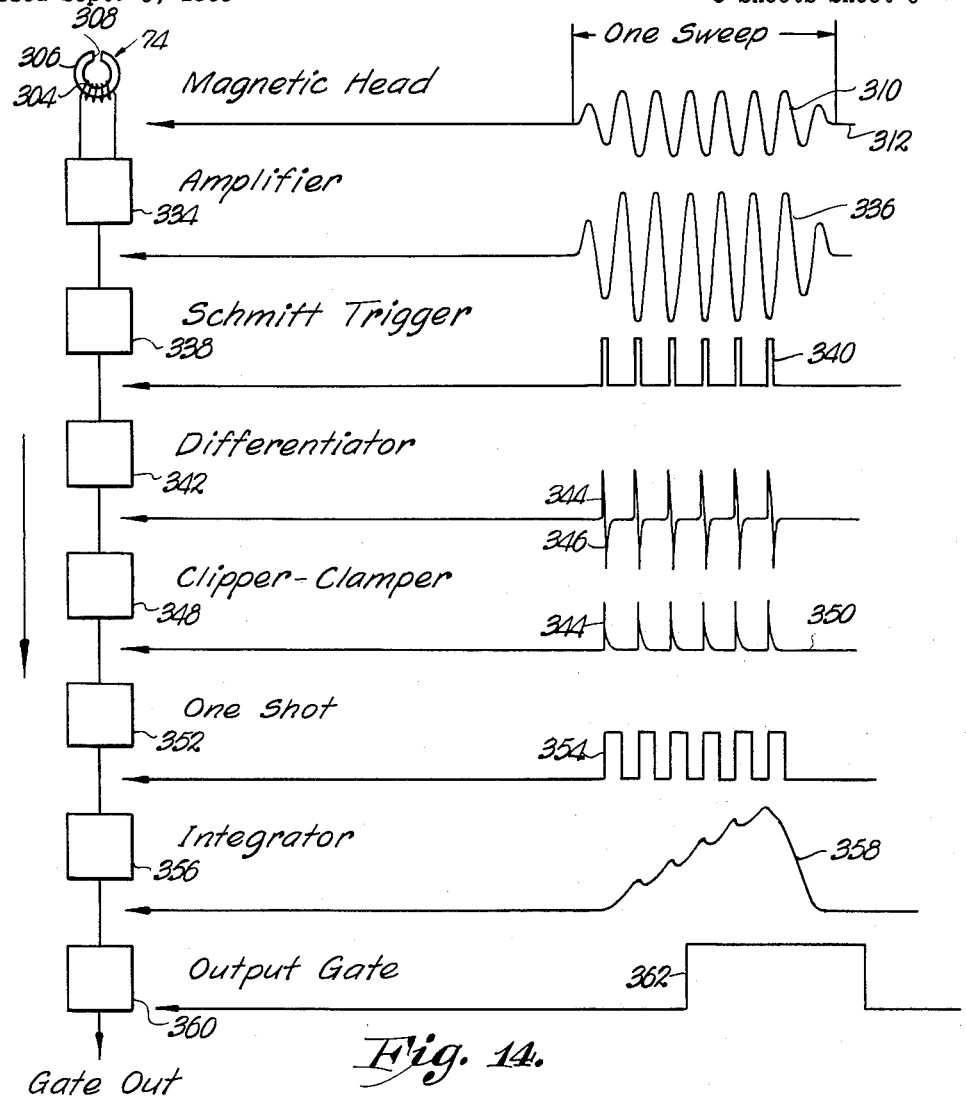
Figure 15:
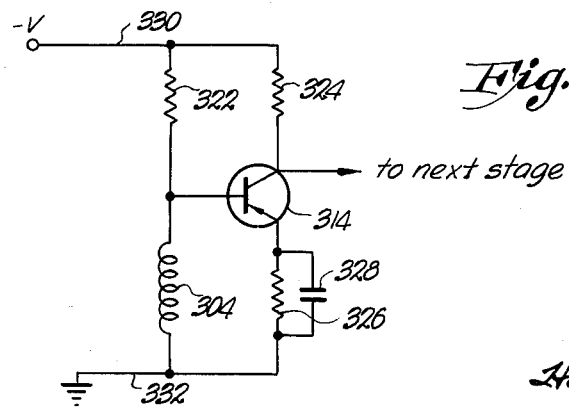

In the drawings:
FIGURE 1 is a top plan view of the apparatus of the instant invention;
FIG. 2 is a side elevational view of the apparatus;
FIG. 3 is a front elevational view of the apparatus;
FIG. 4 is a fragmentary, sectional view taken along line 4—4 of FIG. 1;
FIG. 5 is a fragmentary, sectional view taken along line 5—5 of FIG. 1;
FIG. 6 is a detailed view taken along line 6—6 of FIG. 3;
FIG. 7 is a detailed view taken along line 7—7 of FIG. 3;
FIGS. 8–12 are detailed views of timing cams taken along correspondingly numbered lines of FIG. 2;
FIG. 13 is an electrical schematic diagram of the control circuitry of the instant invention;
FIG. 14 is a block diagram of the electronic circuitry of the invention showing representative wave forms at each stage of the circuitry; and
FIG. 15 is an electrical schematic diagram of the magnetic head and its transistor preamplifier.

*Mechanical components of the apparatus*

Referring to FIGS. 1–7, the numeral 20 denotes the front wall or panel of a housing 21 containing the apparatus to be described hereinafter. The components of the apparatus within the housing 21 (shown broken away) are mounted either on, or within, a case or support 22. A shelf 24 is integral with case 22 and extends outside of the housing 21 through front panel 20.

A tray 26 is slidably received by shelf 24 for reciprocal movement between the normal position shown in the drawings and a position within the housing to be described in detail hereinafter. Tray 26 is recessed at 28 to receive paper currency and is provided with a currency holder 30. Holder 30 is hingedly mounted along its rear edge 32 for swinging movement about a horizontal axis. Tab 34 integral with holder 30, presents a handle for manual, upward swinging movement of the holder 30 to permit placement of a bill in recess 28, whereupon the holder may then be returned to the normal bill-retaining position thereof.

Support or case 22 has mounted thereon a prime mover (electric motor and gear unit) 36 provided with a vertical extending output shaft 38. Linkage, generally designated 40, couples shaft 38 with the rearward edge 42 of tray 26. A pair of spaced, converging extensions 44 integral with edge 42 connect linkage 40 to tray 26. Linkage 40 includes a crank arm 46 rigid with shaft 38. The end of arm 46 remote from shaft 38 is provided with an upstanding stud 48 thereon which is received within an elongated slot 50 in the link 54.

Link 54 interconnecting arm 46 with tray 26 is provided with an upstanding stud 56 adjacent arm 46. Extension spring 58 has opposed ends thereof attached to studs 48 and 56 respectively thus providing a yieldable or nonrigid coupling between the power-driven arm 46 and link 54. Member 52 on link 54 permits longitudinal adjustment of the position of slot 50, thus controlling the effective length of link 54.

Link 54 is pivotally coupled to extensions 44 of tray 26 by pin 60 as shown in FIG. 5 wherein it can be seen that spring 62 connects end 64 of link 54 with the joined ends 66 of extensions 44. Pin 60 extends through a slot 67 in link 54, this slot permitting longitudinal shifting of the tray 26 against the action of spring 62 when linkage 40 is fully extended as illustrated in the drawings.

It should be understood at this juncture that operation of prime mover 36 rotates shaft 38 to, in turn, move tray 26 from the position shown to a location within the housing where edge 42 engages the actuator button 68 of tray-in switch 70. During this operation and subsequent return of the tray to the position shown, crank arm 46 makes one complete revolution about shaft 38 while the link 54 pivots about stud 48 and pin 60.

On top of the apparatus and extending across the center thereof, is an arm or member 72 having a magnetic head 74 mounted at one end thereof and depending therefrom. The opposite end of arm 72 is suspended by a hinge pin 76 secured to a bracket 78. Bracket 78 is integral with arm 72 and pivotal about a vertical axis provided by one pair of arms of mounting member 80. Another pair of arms of member 80 provides a pivot for arm 72 about a horizontal axis defined by pin 82. The latter pair of arms of member 80 extend beyond pin 82 for pivotal coupling to a flange 86 at the upper end of actuator link 88. It will be appreciated hereinafter that link 88 is employed to swing arm 72 about pin 82 to move head 74 into contact with the currency in tray 26. The U-shaped bracket 89 mounted on case 22 serves as a support for member 80 through the medium of pin 82 as is apparent from FIGS. 1 and 3.

The other primary components of the mechanical apparatus mounted on top of the casing or support 22 is a currency removal and gate assembly 90. Assembly 90 is mounted on the opposite side of support 22 from the arm-swinging mechanism described in the above paragraph and is employed to remove currency from the tray after the genuineness of the currency has been ascertained by the apparatus.

Power for mechanism 90 is supplied by scan-accept motor 92 which has an output shaft 93 operably coupled with a shaft 94 by belt and pulley assembly 95. A U-shaped mount 96 is attached to the side of case 22 and presents a pair of pedestals 98 to facilitate the mounting of assembly 90 on the case. Shaft 94 is journaled in pedestals 98 and spans the distance therebetween.

Pulley structure 100 is disposed between pedestals 98 in surrounding and fixed relationship to shaft 94. This is clearly revealed in FIG. 4. A boom 102 is mounted on shaft 94 for swinging movement thereabout and extends laterally outwardly therefrom toward head 74. Boom 102 carries a pin 104 upon which is mounted a roller 106. Four bands 108 are received by annular grooves in roller 106 and pulley structure 100, it being evident that such bands are trained around the structure and the roller to drive the later upon energization of motor 92.

A U-shaped extension 110 is integral with boom 102 and extends laterally outwardly away from the apparatus. Leg 111 of extension 110 is pivotally joined with a link 112. This interconnection is formed by a stud 113 extending from leg 111 and received by a longitudinal slot (not shown) in link 112. A spring 115 joins stud 113 with the upper extremity 117 of link 112. Stud 113 is biased toward extremity 117 under the action of spring 115. Below stud 113 a forked member 114 is attached to link 112 and extends laterally therefrom toward pulley structure 100. Fork 114 receives a pin 116, the latter being attached to one leg of a U-shaped gate 118. Gate 118 is swingable about shaft 94 and underlies extension 110.

The bight of U-shaped mount 96 presents a horizontal ledge 120 which extends toward the viewer in FIG. 2. Ledge 120 has a pair of grooves 122 therein which receives tabs 124 integral with gate 118. A protuberance 126 integral with gate 118 is disposed between tabs 124 and extends obliquely upwardly toward pulley structure 100.

It will be shown hereinafter that link 112 is biased downwardly into the position shown in the drawings. Through interconnection with assembly 90 by means of leg 111 and fork 114, link 112, in the position shown, maintains rubber roller 106 vertically spaced from the path of travel of tray 26 and holds gate 118 closed with the depending tabs 124 thereof received in grooves 122. Before proceeding further with this description, however, it should be understood that upward shifting of link 112 effects opening of gate 118 and downward movement of roller 106 so that the latter, in conjunction with mechanism to be described hereinafter, may engage currency disposed in recess 28 for the purpose of removing or extracting currency from recess 28 after such currency is determined to be genuine.

To assist in the currency removing function of roller 106, pulley structure 100 is provided with a ring 132 also of rubber or the like. Ring 132 engages a roller 134 which is mounted on a rod 136 disposed between pedestals 98. A plate 138, forming a part of case 22, has a pair of leaf springs 140 mounted on the underside thereof. A pair of holes in the plate receive corresponding studs 142 which are attached to the ends of rod 136. Leaf springs 140, as is evident in FIG. 4, bear against the studs 142 forcing the same along with rod 136 upwardly. This places roller 134 in engagement with ring 132 to form a gripper for directing currency through gate 118 when the later is open. It will be appreciated that the action of springs 140 permits yielding of roller 134 (movement of the roller away from ring 132) when paper currency passes between the roller and the ring.

A U-shaped wire 144 is also employed to assist in directing the currency through gate 118. The ends of the legs of the wire are bent into hooked configurations and are hooked around pulley structure 100. Wire 144 is thus free to swing when the same is contacted by currency passing between ring 132 and roller 134.

Additional structure mounted on top of case 22 includes a block 128 eccentrically mounted on shaft 94. A rod 130 connects block 128 with bracket 78 for the purpose of oscillating the bracket about hinge pin 76 upon energization of scanner motor 92. It is evident that such oscillation effects swinging movement of head 74 in the directions shown by the arrow in FIG. 1.

Within case 22 and beneath assembly 90, a shaft 146 is disposed having thereon five cams 148, 150, 152, 154 and 156. Shaft 146 is operably coupled with an electric motor 158, the motor and the cams serving as the basis of a timing mechanism for co-ordinating the operation of the various components of the apparatus. The configurations of the various cams may be seen in FIGS. 8–12.

Cam 148 has a notch 160 therein which actuates a follower 162. Cam 150 has a notch 164 therein which actuates a follower 166. In like fashion, cam 152 has a recessed surface 168 therein for controlling the operational state of follower 170. The various cams and their associated followers are shown in the drawings in their initial dispositions when the apparatus is in stand-by.

Switch assemblies 171, 172 and 173 are mounted in operative association with followers 162, 166 and 170, respectively. The switches within assemblies 171–173 will be described fully hereinafter when reference is made to the electrical schematic of FIG. 13.

Cam 154 is employed solely as a mechanical actuator to control the raising and lowering of head 54 and therefore, is not illustrated in the electrical schematic showing in FIG. 13, and is provided with a raised portion 174 which engages a follower 176 upon rotation of shaft 146. Likewise, cam 156 is provided with a raised portion 178 which engages a follower 180 upon rotation of shaft 146.

An arm 182 is pivotally mounted at 184 to case 22. One end of the arm is pivotally interconnected with link 112. The opposite end of the arm 182 carries follower 180 which is engaged by cam 156 during rotation of the cam. A spring 188 yieldably maintains arm 182 in the position shown in the drawings, it being evident that spring 188 also maintains link 112 in the position shown until rotation of cam 156 effects rotation of arm 182 about point 184 to thereby shift link 112 upwardly.

It may be noted that a switch 189 is mounted below arm 182 in disposition for actuation by an angle member 191 attached to the arm. When the components are in their normal positions shown, member 191 actuates switch 189 but moves out of engagement therewith upon shifting of the arm and link mechanism by cam 156. Switch 189 will be referred to hereinafter as the "gate switch"; its purpose and function will be discussed when the control circuitry is described hereinafter.

Another arm 190 is pivotally mounted at 192 to case 22 and is interconnected at its right end (as viewed in FIG. 3) with the lower end of link 88. A spring 194 yieldably maintains arm 190 in the position shown in the drawings. The left end of arm 190 carries follower 176. Rotation of cam 154 to engage its raised portion 174 with follower 176 effects rotation of arm 190 in a counterclockwise direction about point 192 (as viewed in FIG. 3) to shift link 88 upwardly against the action of spring 194.

In FIGS. 3 and 7 it may be seen that a pair of rollers 196 are disposed within case 22 beneath roller 106. Rollers 196 are mounted on a pin 198 which is carried by a U-shaped bracket 200. A solenoid 202 underlies rollers 196 and is provided with an armature 204. Armature 204 is connected with the bight of an upstanding, U-shaped element 206, element 206 being suspended within case 22 by a pair of studs 208 on corresponding legs 210 of element 206. Each stud 208 is disposed adjacent the free end of its leg 210 and is received by an opening in a wall 212 of a U-shaped mounting plate 214. The bight of bracket 200 spans the distance between the free ends of legs 210 and is connected thereto by a crosspiece 216 integral with legs 210. The force of gravity maintains rollers 196 in the position shown in the drawings with the ends of pin 198 resting upon corresponding walls 212.

Energization of solenoid 202 shifts armature 204 leftwardly as viewed in FIGS. 3 and 7 to swing bracket 200 and its rollers 196 in a clockwise direction (as viewed in FIG. 3) about studs 208. This raises rollers 196 and, since tray 26 is shifted to its position within the housing with edge 42 in contact with actuator button 68, rollers 196 extend upwardly through openings 218 in the recessed portion 28 of the tray.

Reference is now made particularly to FIGS. 3 and 6 wherein a tray-out switch 220 is shown having an actuator button 222. Switch 220 is disposed within case 22 adjacent rollers 196 and beneath assembly 90. In a manner to be described fully hereinafter, tray-out switch 220 effects energization of prime mover 36 to move tray 26 to its position within housing 21 upon release of the actuator button 222 for switch 220 so that the contacts thereof may close. As is apparent from FIG. 6, switch actuator rod 224 is normally biased into engagement with button 222 by spring 226 to maintain the contacts of switch 220 closed. However, actuator rod 224 has a disc 228 on the extremity thereof remote from switch 220 which is disposed to be engaged by tray 26 when the latter is in the normal outermost position thereof for maintaining rod 224 out of engagement with button 222 so that the contacts of switch 220 are maintained in an open position until tray 26 is manually pushed inwardly a sufficient distance to permit the rod 225 under the bias of spring 226 to shift button 222 and thereby change the condition of the contacts of switch 220.

Control circuitry

The control circuitry for the apparatus is shown in FIG. 13. It may be noted that many of the mechanical components described above are shown diagrammatically in FIG. 13. Specifically, attention is directed to the prime mover or tray motor 36 which is operably coupled with tray 26 by linkage 40. Note also the scan-accept motor 92 and the timing motor 158 with its associated cams and switch assemblies. Solenoid 202 for actuating rollers 196 is also shown.

Switch assembly 171 responsive to cam 148 comprises a single-pole, double-throw switch 171a and a single-pole, single throw switch 171b. Switch assembly 173 responsive to cam 152 contains only a single-pole, single-throw switch. Switch assembly 172 responsive to cam 150 comprises a single-pole, single-throw switch 172a and a single-pole, double-throw switch 172b. The various switches and cams are shown in their stand-by positions prior to operation of the apparatus.

The gate switch 189 is a single-pole, single-throw switch and is shown in its stand-by position held in engagement with its contact by arm 182. It may be appreciated that rotation of cam 156 forces its raised portion 178 into contact with follower 180 to swing arm 182 about point 184 as described above. This, in turn, permits switch 189 to move to its open position under the influence of an internal spring (not shown) or other suitable means.

The function of gate switch 189 is to send an electrical command along line 230 to auxiliary apparatus (not shown) for the purpose of controlling such apparatus if currency is properly removed from the tray after testing. It will be seen, when the operation of the apparatus is set forth hereinafter, that gate switch 189 will remain open if currency, for one reason or another, becomes lodged in gate 181. It will be appreciated that such auxiliary apparatus in a currency changer will take the form of change mechanism operable to pay out the proper amount of change if the bill is deemed genuine.

Other components of the control circuitry not heretofore described, include a pair of ganged, currency-responsive, single-pole, single-throw switches 232 and 234; an accept relay 236 comprising a relay coil 238, a single-pole, single-throw switch 240, and a single-pole, single-throw switch 242; and a control relay 244 comprising a relay coil 246, and four single-pole switches 248, 250, 252 and 254 having contacts associated therewith in the manner as shown in FIG. 13.

Electrical power for the various motors and relays shown in FIG. 13 (except relay 36) is supplied by alternating current lines 256 and 258. Power for relay coil 238 of relay 236 is supplied by direct current lines 260 and 262. A control lead 264 is connected with one side of relay coil 238 and is electrically interconnected with line 262 by external circuitry (not shown) when it is desired to energize coil 238. This interconnection of lead 264 and line 262 is effected in response to an electrical output from electronic circuitry to be described hereinafter, such electrical output being generated in response to predetermined magnetic properties of the currency under test indicative of its genuineness.

It may be noted that tray-in switch 70 and tray-out switch 220 are shown associated with tray 26 and that, the circuitry is dormant. In the description of the operation to follow it will be seen that actuation of tray-out switch 220, upon manual shifting of tray 26, initiates the control circuitry and hence the operation of the apparatus. A normally closed overstress switch 266 is provided in series with tray motor 36 to effect de-energization thereof should unusual stresses be placed on linkage 40. This is a safety device which stops the motor in the event that the operator should inadvertently catch his fingers between the tray and the front panel when the latter is being shifted by motor 36.

Operation of the electromechanical portion of the apparatus

Before the electronic, genuineness-detecting circuitry is described, it is instructive to first understand the operation of the mechanical components of the apparatus under the influence of the control circuitry shown in FIG. 13.

As aforementioned, initiation of the apparatus is effected by manual shifting of tray 26, such as by pushing on tab 34, to move the tray a sufficient distance to actuate tray-out switch 220. Referring to FIG. 13, such actuation of switch 220 establishes the following electrical circuit: From line 258 to lead 268 and switch 220, along lead 270 through switch 266 to tray motor 36, along lead 272 to switch 171b, along lead 274 to switch 252, and then along lead 276 to A.C. line 256. The motor is thus energized and actuates linkage 40 to shift tray 26 within the housing, shelf 24 serving as a guide for the tray. Prior to manual shifting of the rtay to actuate tray-out switch 220, the operator of the apparatus places currency to be tested in recess 28. This is effected by raising and lowering holder 30 and slipping the paper currency under the holder into the recess, whereupon holder 30 in the lowered position then releasably maintains the currency in place in the recess.

Attention is directed to the ganged, single-pole switches 232 and 234. These switches, through suitable linkage means 278, operate in response to the presence of paper currency in recess 28. It should be understood that means 278 could be any one of a variety of paper-responsive actuating devices including, for example, a light-sensitive system which detects the presence of currency in the recess by directing light rays through such currency. Alternatively, for example, a pressure-sensitive switch could be disposed in recess 28. Any of these arrangments are within the skill of the art and will not be further discussed in this specification.

Tray motor 36 moves the tray within the housing until edge 42 of the tray strikes the actuator button 68 of tray-in switch 70. This establishes the following electrical circuit: From A.C. line 258 along lead 280 to switch 172b, along lead 282 to junction point 284, along lead 286 through the now closed tray-in switch 70 to relay coil 246, along lead 288 to the now closed currency switch 234, along lead 290 to switch 171a, and hence through switch 171a to A.C. line 256. Relay coil 246 is thus energized and switch 252 is moved into engagement with its lower contact. This breaks the power circuit to tray motor 36 and halts the movement of the tray.

At this point in the operation of the apparatus the tray becomes a test station for the currency carried thereby. Energiaztion of relay 244 effects operation of scan-accept motor 92 and timing motor 158 to execute the testing function. The power circuit for motor 92 is as follows: Along A.C. line 258 to motor 92, along lead 292 to switch 252, and then along lead 276 to line 256. The circuit initiating the operation of timing motor 158 is as follows: From line 256 along lead 276 to the now closed switch 250, along lead 294 to motor 158, through junction point 284 and along lead 282 to switch 172b, and then along lead 280 to A.C. line 258.

Operation of motor 92 effects the oscillation of head 74 and also drives roller 106. Simultaneously, energization of the timing motor rotates cam 156 to move link 112 upwardly, thereby opening gate 118 and swinging roller 106 into slightly spaced relationship with the currency in recess 28. Roller 106 will overlie openings 218.

The timing motor also effects upward movement of link 88 to swing head 74 downwardly into pressure contact with the currency. Cam 154 effects this function. It may be seen that head 74 will oscillate in a plane parallel to the currency.

Cam 148 is the first to actuate its switch assembly 171. When follower 162 moves out of notch 160, the switches 171a and 171b will shift, switch 171a then engaging its upper contact while switch 171b opens. Switch 171a in cooperation with lead 296, serves as a holding circuit for timing motor 158. Switch 171b assures that the tray motor 36 will remain de-energized until it is desired to return the tray to the stand-by position. This is done since line interruptions or manual pulling on the tray could re-energize the tray motor before the necessary control functions have been completed. Movement of the tray 26, for example while the head 74 is in contact with the currency, would result in damage to the head because of interference to shifting of the tray by the head when the latter is in test position.

Oscillation of head 74 across the currency in the tray tests the genuineness thereof through the use of a magnetic field and electronic circuitry to be fully described hereinafter. At this juncture it need only be understood that, if the currency is determined to be genuine, control lead 264 will effect energization of relay coil 238. Assuming that the bill is valid and that coil 238 is energized, cam 152 will then initiate bill removal when its recess 168 becomes aligned with follower 170. This establishes the following electrical circuit: From A.C. line 258 to solenoid 202, along lead 298 to the now closed switch 242, along lead 300 to the now closed switch 173, and hence along lead 296 through switch 171a to line 256.

Energization of solenoid 202 effects upward movement of rollers 196 and the currency is thus gripped between these rollers and the rotating roller 106. Rotation of roller 106 is in a clockwise direction as viewed in FIG. 3; therefore, the bill is pulled out from under holder 30 and advanced toward gate 118. Gate 118 was earlier opened by fork 114 when link 112 was shifted upwardly. The bill is thus permitted to pass through the gate and is directed into a suitable receptacle (not shown) which, in currency changers, may take the form of a cash box. It may be recalled that the structure illustrated in FIG. 4 effects positive directing of the currency through the gate.

At this stage of the operation of the apparatus, cam 156 has rotated approximately ¾ths of a turn. Portion 178 of the cam is thus expended and arm 182 returns to its normal position under the influence of spring 188. This closes gate 181 and returns gate switch 189 to the position shown. Also, currency switches 232 and 234 return to their normal positions shown since currency is no longer in the tray. This creates the following electrical circuit: From A.C. line 256 to switch 171a, along lead 296 to switch 173, along lead 300 to switch 142, along lead 298 to switch 232, and hence along lead 302 to gate switch 189 and line 230. Since switch 173 will remain closed a short time after cam 156 closes gate 118, line 230 will be momentarily coupled with line 256 to place an A.C. signal on line 230 to command auxiliary apparatus (not shown) to function in response to passage of the currency through the gate. As aforementioned, such auxiliary apparatus may be a change pay-out mechanism when the instant invention is employed in a currency changer.

It should be understood that line 230 will be momentarily energized only if the bill successfully passes through the gate since, if the bill becomes lodged therein, gate switch 189 will remain open. If the bill becomes lodged in the gate, it will be trapped betwen the tabs 124 on the gate 118 and ledge 120. The gate will thus remain partially open since tabs 124 will be prevented from seating in corresponding grooves 122. Therefore, link 112 will be unable to return to its lowermost position; thus, angle member 191 on arm 182 will be unable to reengage switch 189 to close the latter. Manifestly, such lodging of the bill would require servicing of the unit by maintenance personnel prior to additional use thereof.

The signal from the electronic detection circuitry will only last a relatively short period of time sufficient in length to pull in relay 236. Therefore, a holding circuit through switch 240 of relay 236 and switch 254 of relay 244 is employed to maintain coil 238 energized. A feature of this arrangement lies in the fact that relay coil 246 must be maintained energized in order for relay coil 238 to remain energized. Thus, if tray-in switch 70 is de-activated by manual pulling on tray 26, relay coil 246 will become de-energized and the apparatus will no longer be able to pay out change.

The operational states of the various components of the apparatus commence reversion to normal when notch 164 in cam 150 comes into alignment with follower 166. Movement of switch 172b into engagement with its lower contact breaks the power circuit to timing motor 158 and de-energizes relay coil 246. Simultaneously, closure of switch 172a establishes a power circuit for tray motor 36 by connecting the upper lead 272 from the motor with line 256. Motor 36 thus returns tray 26 to its standby position outside of housing 21.

As the tray approaches its normal position, tray-out switch 220 moves to its normal position shown and reenergizes timer motor 158. This is effected by a circuit through the now closed switch 172b. Timer motor 158 then operates until notch 160 in cam 148 returns to alignment with its follower 162. This opens the holding circuit to the timing motor since switch 171a is returned to its normal position. All of the components of the circuitry have now reverted to their normal states.

The electronic detection system

The electronic detection circuitry of the instant invention is illustrated in FIGS. 14 and 15. It may be seen that the magnetic head 74 is shown in diagrammatic form. The various stages of the circuitry are represented by appropriately labeled blocks and the voltage wave form appearing at the output of each stage is illustrated. The block diagram form is used in FIG. 14 since each stage per se is conventional structure widely used and well known in the art.

The magnetic head comprises an inductor 304 having a core 306 therethrough. Core 306 is provided with an air gap 308. Head 74 may be a conventional one channel tape recording and reproducing head, or may be a dual channel or stereo head. If a stereo head is employed, the two field producing circuits thereof may be connected in series.

It is instructive to note at this point that the width of air gap 308 is somewhat critical if optimum performance of the detection apparatus is to be realized. In a United States $1.00 bill, a numeral "1" is imprinted on the front of the bill and serves as a background for the phrase, "This Certificate Is Legal Tender for All Debts Public and Private." Within this numeral is contained a number of closely spaced, parallel lines. These lines are imprinted on the bill in magnetic ink. For optimum performance of the apparatus, the width of gap 308 should be less than the spacing between adjacent lines. Such spacing between the lines is uniform and is thus indicative of a genuine bill since a counterfeit bill may not contain the precise, uniform spacing of a genuine bill or may have fewer lines with correspondingly fewer spaces.

Head 74 is placed on arm 72 so that, upon oscillation of the arm, the head will sweep across the lines with the gap substantially parallel to the lines. The head is disposed on the arm so that gap 308 will be in pressure contact with the paper currency when the arm is rotated about pin 82 to engage the head with the bill.

Waveform 310 illustrates the changing voltage across inductor 304 as the head is swept across the magnetic lines on the currency. The base line or zero reference 312 indicates the steady state, direct voltage across inductor 304. It will be appreciated that a flow of direct current through the inductor produces a magnetic field in core 306 of constant flux as long as air gap 308 is undisturbed.

Since air gap 308 is of relatively high reluctance, however, a change in the flux will occur when the gap is brought into contact with the lines of magnetic ink on the bill. In other words, as the gap traverses each magnetic line, the presence of the line increases the permeability of the gap 308. It is evident that a corresponding decrease in gap reluctance will result and that, therefore, the flux in the magnetic circuit of core 306 will rise to a peak as each magnetic line is crossed.

The changing flux in core 306 induces an electromotive force in inductor 304 in accordance with well understood principles of electromagnetism. This E.M.F. is represented by waveform 310 and appears at the head output (across inductor 304). Since the induced E.M.F. is proportional to the rate of change of the flux, the voltage across the inductor will swing positively and negatively in nearly sinusoidal fashion as illustrated by waveform 310. Each sinusoid corresponds to movement of gap 308 across one magnetic line.

It should be understood that, depending on gap width and variations in the magnetic properties of the ink itself, the shape of wave form 310 will not necessarily be of the nearly sinusoidal configuration shown. Such configuration, however, is illustrative of the rise and fall of the E.M.F. as each line is crossed.

Referring now specifically to FIG. 15, it may be seen that the inductor 304 of head 74 is shown arranged with other electrical elements to form a voltage amplifier stage. This stage serves as a preamplifier which may be employed to drive additional stages of amplification until a signal of suitable magnitude is obtained. The preamplifier comprises a PNP transistor 314 and bias circuitry resistors 322, 324 and 326. A bypass capacitor 328 is connected across emitter resistor 326.

As illustrated in FIG. 15, direct voltage is applied across leads 330 and 332 with the polarity shown. Those skilled in the art will appreciate that this circuit forms a stage of amplification modified by the presence of inductor 304 connected between the base of transistor 314 and lead 332 or ground. The parameters of the bias circuitry are set so that the transistor 314 will be operating on the linear portion of its output characteristic. Thus, variations in the voltage across inductor 304 by the changing flux during sweeping of the head will be sensed by the emitter-base circuit of transistor 314 and amplified by transistor action for transmission to subsequent stages.

As above mentioned, subsequent stages of amplification may be added to the preamplifier shown in FIG. 15 until a suitable output level is obtained. This is illustrated in FIG. 14 by amplifier 334. The output from amplifier 334 is shown at 336.

Output signal 336 is fed to a Schmitt trigger circuit 338 which produces pulses 340 at its output. Each pulse 340 is initiated when the voltage level of signal 336 reaches a predetermined negative value. Each pulse 340 terminates when the level of the negative voltage returns to a predetermined value. Thus, each pulse 340 is approximately aligned with a corresponding negative peak of signal 336. It should be understood that the wave form diagrams are arranged so that corresponding points in time on the various graphs are vertically aligned. The Schmitt trigger employs a conventional circuit well known to those skilled in the art, and a detailed description thereof is unnecessary in this specification.

The train of pulses 340 from the Schmitt trigger output is fed to a differentiator network 342. This network may comprise a conventional RC arrangement for producing a positive spike pulse 344 and a negative spike pulse 346 in response to each pulse 340. Spike pulse 344 corresponds to the rising or positive-going edge of the corresponding pulse 340, while negative spike 346 corresponds to the negative-going edge of the corresponding pulse 340.

The differentiator output is then transmitted to a clipper-clamper circuit 348 wherein the negative spikes 346 are removed. The clipper may comprise a rectifying diode which blocks the passage of the negative spikes. Clamping is employed so that the reference 350 at the clipper-clamper output will be maintained at zero volts.

The output of the clipper-clamper 348 is then fed to the control input of a monostable multivibrator or "one shot" 352. The multivibrator 352 may be any one of a variety of conventional types designed to produce one output pulse 354 of a predetermined width each time a spike pulse is applied to the control input thereof. The width of the output pulse 354 is controlled by the parameters of the multivibrator circuit.

The one shot output is coupled with an electrical integrator 356. Integrator 356 may be a step-charging diode circuit, but this is exemplary only and not requisite. The integrator produces an output signal 358 having an amplitude dependent upon the number of pulses 354 produced by the one shot. Since each pulse 354 is of the same configuration, output signal 354 will rise approximately in proportion to the duration of the one shot output.

The integrator output is coupled with an output gate 360. Gate 360 may take the form of transistor circuitry responsive to signal 358 from the integrator 356 when the signal reaches a predetermined level. When this level is reached, the output gate produces a pulse 362 which is used for control purposes to be described hereinafter. The output gate circuit should be designed so that pulse 362 will be of a certain minimum width even though the output from the integrator should fall below the level needed to initiate pulse 362.

A review of the functions of the circuitry illustrated in FIG. 14 reveals that the one shot 352 produces an output pulse 354 each time the magnetic head crosses a line of magnetic ink on the bill. These pulses are uniformly spaced from one another because the magnetic lines on the bill are also uniformly spaced and the speed of the head sweep is substantially constant. The time constant of the integrator 356 therefore, is set so that a predetermined number of pulses 354 must occur in a given period of time in order for the integrator output to build to the level necessary to trigger the output gate 360. Therefore, spurious currency with widely spaced, irregularly spaced, or insufficient lines will likely fail to build the integrator output to a sufficient level.

It should be understood at this juncture that, although the head 74 and its associated arm 72 have been above described as oscillating across the bill, such oscillation is not requisite to operation of this apparatus. A single sweep would be sufficient if circuit constants were so adjusted to properly respond to a single sweep. In other words, additional sweeps merely reproduce the sweep shown at 310 and, in effect, increase the number of lines scanned by the head.

Since the production of gate pulse 362 is effected by currency having magnetic properties indicative of genuineness, it is evident that such pulse may be utilized in conjunction with the electromechanical apparatus set forth earlier in this specification. Specifically, it will be remembered that energization of the coil 238 of accept relay 236 is necessary before solenoid 202 can be energized to shift rollers 196 upwardly to remove the bill from the tray. Therefore, suitable electrically responsive switching means (such as a switching transistor) may be operably coupled with output gate 360, line 262, and control lead 264 to effect interconnection of the line and lead in repsonse to pulse 362. If counterfeit currency printed with non-magnetic ink, or with magnetic lines having the deficiencies discussed above, is placed in the tray, pulse 362 will not be produced and, therefore, relay coil 238 will not be energized.

It follows that solenoid 202 will not be energized and the counterfeit will consequently remain in the tray to be returned to the customer. Also, auxiliary apparatus such as coin change pay out mechanism, normally energized from line 230, does not become actuated.

Having thus described the invention, what is claimed as new and desired to be secured by Letters Patent is:

1. In a currency tester:
   means for releasably holding currency to be tested in a stationary position;
   a magnetic sensing device for producing an electrical signal upon relative movement of the device and the currency;
   structure coupled with the device for moving the latter relative to said holding means to scan currency held thereby, whereby the presence of magnetic ink in the currency under test causes said signal to be produced by the device;
   means responsive to said electrical signal for removing the tested currency from the holding means, and including a normally closed gate, means coupled with the gate for opening the latter for a predetermined period of time, and structure for directing the tested currency through the gate while the latter is open; and
   control means coupled with said gate and adapted to be operably coupled with auxiliary apparatus for preventing operation of the latter unless the gate is closed, whereby to assure that the auxiliary apparatus will remain inoperative if the tested currency becomes lodged in the gate and prevents closure thereof.

2. The invention of claim 1, wherein said holding means means is reciprocable between a normal position where currency is loaded thereon and a test position where the loaded currency is tested.

3. The invention of claim 2, wherein is provided a prime mover coupled with the holding means for reciprocating the latter, there being second control means coupled with said device moving structure for actuating the latter when the holding means is moved to said test position.

4. The invention of claim 3, wherein said prime mover is responsive to manual shifting of the holding means for moving the latter to said test position.

5. In a currency tester:
   a tray for receiving currency to be tested;
   a member mounted for movement along a path of travel substantially parallel with the major plane of the tray;
   magnetic detection means including a sensing head mounted on said member for scanning the currency in the tray during said movement of the member, said means being operable to produce an output signal if said currency has characteristic magnetic properties;
   power means coupled with said member and responsive to the presence of said currency in the tray for moving the member along said path of travel;
   mechanically shiftable structure operably associated with said tray for removing said currency therefrom, and including a normally closed gate, means coupled with the gate for opening the latter for a predetermined period of time, and means for directing the tested currency through the gate while the latter is open;
   first control means operably coupled with said structure and said detection means and responsive to said output signal therefrom for actuating the structure, whereby to remove the currency from the tray if it has said characteristic magnetic properties; and
   second control means coupled with said gate and adapted to be operably coupled with auxiliary apparatus for preventing operation of the latter unless the gate is closed, whereby to assure that the auxiliary apparatus will remain inoperative if the tested currency becomes lodged in the gate and prevents closure thereof.

6. The invention of claim 5, wherein said directing means includes a powered roller and an idler roller both shiftable toward said tray from opposite sides thereof, there being means coupled to said rollers for first shifting said powered roller into the proximity of said currency and thereafter shifting said idler roller toward and into engagement with the currency in response to said output signal to move the currency into contact with the powered roller to effect removal of the currency from the tray.

7. The invention of claim 5, wherein said tray has an opening therein through said major plane thereof, the tray receiving said currency with the latter covering the opening, said directing means including a pair of relatively shiftable, rotatable rollers on opposed sides of said opening for engaging said currency therebetween upon movement of one of the rollers into the opening and toward the other roller, said first control means shifting said one roller toward the other roller in response to said output signal.

8. The invention of claim 5, wherein said member comprises an arm disposed for swinging movement with one end of the arm following said path of travel, said sensing head being attached to said one end of the arm.

9. In a currency tester:
a housing provided with a front panel;
a reciprocable tray for receiving currency to be tested, said tray being movable between a first, normal location forwardly of the panel permitting manual access thereto and a second, test location within the housing;
an arm in the housing mounted for swinging movement about an axis to move one end of the arm along a path of travel substantially parallel with the major plane of the tray when the latter is in said second location;
magnetic detection means including a sensing head mounted on said one end of the arm for scanning the currency in the tray during movement of the one end along said path of travel, said means being operable to produce an output signal if said currency has characteristic magnetic properties;
a prime mover operably coupled with said tray and responsive to manual shifting of the later for moving the tray to its second location;
power means operably coupled with said arm and responsive to the presence of said currency in the tray for swinging the arm about said axis after the tray is moved to said second location;
a first rotatable roller in the housing shiftable toward and away from the tray when the latter is in said second location, said roller being disposed for engagement with the currency to remove the latter from the tray when the roller is shifted toward said tray; and
control means including a second roller, responsive to said output signal for shifting the currency into engagement with the first roller whereby the currency which has been determined to have said characteristic magnetic properties is removed from the tray by said first roller.

10. The invention of claim 9, wherein said arm is swingable about a second axis to move said one end thereof toward and away from said tray between a normal position spaced from the tray and an operative position in contact with the currency in the tray, there being means coupled with the arm and responsive to the presence of said currency in the tray for shifting said arm about said second axis to move said one end to said operative position after the tray is moved to said second location, whereby to place said sensing head in disposition to scan said currency.

11. The invention of claim 10, wherein said power means is operably coupled with said first roller for rotating the latter.

References Cited by the Examiner
UNITED STATES PATENTS

| | | |
|---|---|---|
| 2,961,649 | 11/1960 | Eldredge et al. |
| 3,108,692 | 10/1963 | Patzer. |
| 3,108,693 | 10/1963 | Patzer. |
| 3,133,641 | 5/1964 | Patzer. |

EVERETT W. KIRBY, *Primary Examiner.*